March 12, 1968 R. F. WOODCOCK 3,373,006
APPARATUS FOR MAKING FIBER OPTICAL IMAGE TRANSFER DEVICES
Original Filed Nov. 23, 1960 4 Sheets-Sheet 1

INVENTOR.
RICHARD F. WOODCOCK

INVENTOR.
RICHARD F. WOODCOCK

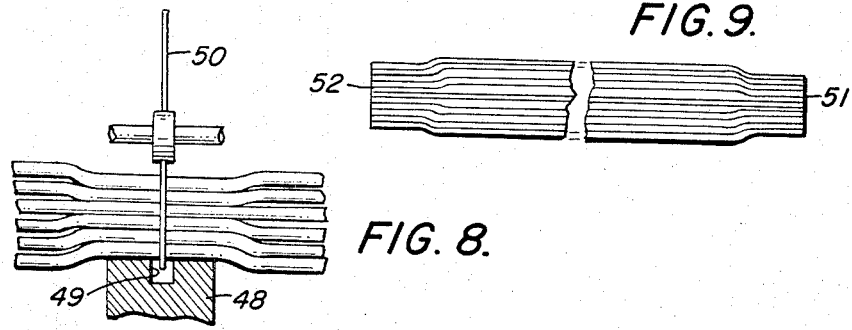
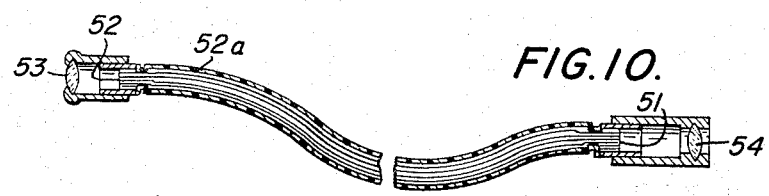
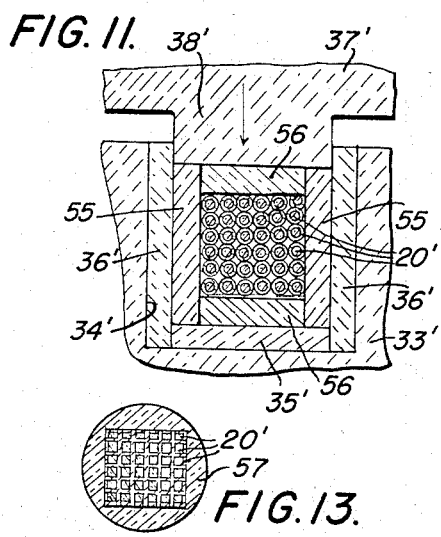
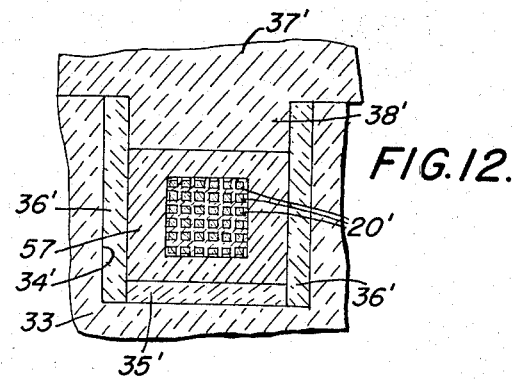
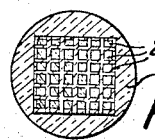

March 12, 1968 — R. F. WOODCOCK — 3,373,006
APPARATUS FOR MAKING FIBER OPTICAL IMAGE TRANSFER DEVICES
Original Filed Nov. 23, 1960 — 4 Sheets-Sheet 4
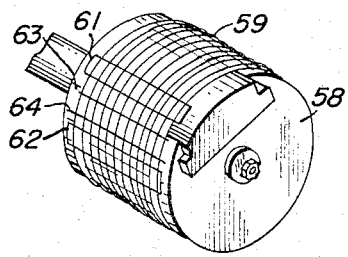
FIG. 14.
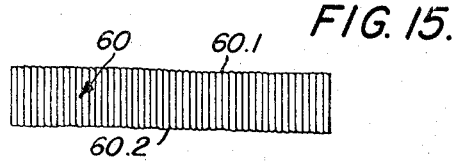
FIG. 15.
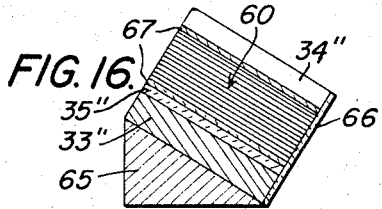
FIG. 16.
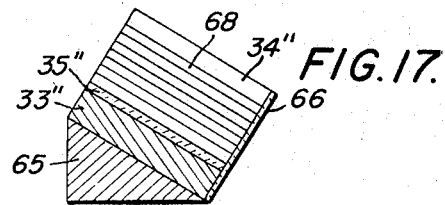
FIG. 17.
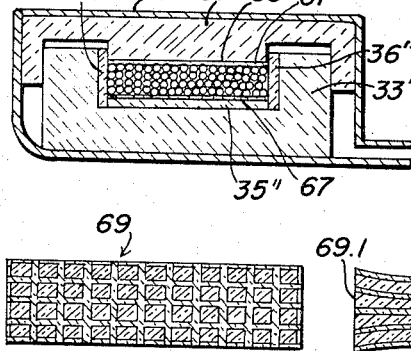
FIG. 18.
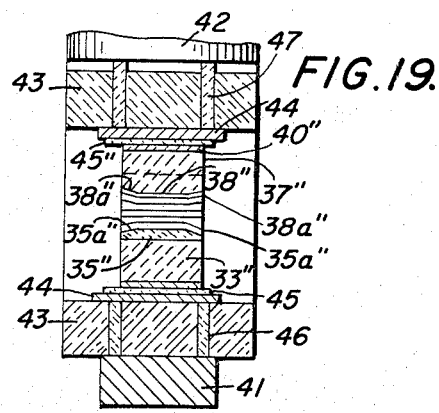
FIG. 19.
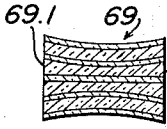
FIG. 21.
FIG. 20.
INVENTOR.
RICHARD F. WOODCOCK United States Patent Office 3,373,006
Patented Mar. 12, 1968

3,373,006
APPARATUS FOR MAKING FIBER OPTICAL IMAGE TRANSFER DEVICES
Richard F. Woodcock, Woodstock, Conn., assignor, by mesne assignments, to American Optical Company, Southbridge, Mass., a corporation of Massachusetts
Application Nov. 23, 1960, Ser. No. 71,872, now Patent No. 3,215,029, Nov. 2, 1965, which is a continuation-in-part of application Ser. No. 826,762, July 13, 1959. Divided and this application Nov. 16, 1964, Ser. No. 422,873
3 Claims. (Cl. 65—1)

ABSTRACT OF THE DISCLOSURE

Supporting means of refractory material for compacting and fusing a length of bundled glass clad fibers. The supporting means has a bottom member, a cover member, side walls and opposite open ends forming a channel in which the bundle may be placed for compaction and fusion. Facing sides of the bottom and cover members have oppositely disposed portions of their lengths sloped gradually away from each other in directions from points internally of the channel toward each of its opposite open ends. At least one of the members is movable toward the other for compressing the length of bundled fibers to a greatest amount intermediately of its extension and in progressively lesser amounts away therefrom.

---

This invention relates to improvements in fiber optical image transfer devices and has particular reference to a novel means of fabricating devices of the type embodying a great number of relatively small elongated light-conducting fibers or filaments including multifibers which are arranged in side-by-side relation with each other and which have at least their ends intimately bundled together to provide compact light-emitting areas or faces at the extremities thereof.

This application is a division of applicant's copending application Ser. No. 71,872 filed on Nov. 23, 1960, now Patent No. 3,215,029 issued Nov. 2, 1965, which copending application comprises a continuation-in-part of applicant's earlier copending application Ser. No. 826,762, which earlier application was filed on July 13, 1959 and is now abandoned.

In devices of the above character wherein a considerable number of elongated, relatively fine fibers or multifibers of light-conducting material are bundled together and used collectively to transmit light or optical images from one location to another, it is of great importance, particularly in the transferring of optical images, that the ends of the fibers at each of the light-accepting and emitting faces of the devices are substantially identically geometrically arranged or patterned. When such devices are used as diagnostic instruments such as gastroscopes or endoscopes or the like, their cross-sectional size must be kept to a minimum while at the same time being capable of transferring a maximum amount of image-forming light with a high degree of accuracy and resolution.

Further, where the image transfer devices are adapted to serve as faceplates and the like for vacuum tubes or for other sealed tubes, it is of first importance that the fibers or multifibers in the devices be joined together in intimate, vacuum-tight relation.

While multiple fiber, image-transfer devices, including devices known generally as fiberscopes and fiber optical faceplates, have been made and used heretofore, their optical efficiencies, particularly those of resolution, contrast and definition have not been as good as might be desired. In this regard, it has been found that these inefficiencies are primarily due to lack of compactness and similarity of geometrical configuration of the fibers at the opposite ends of the devices and to inferior optical finishes at the light-accepting and emitting faces thereof.

In addition, fiber optical faceplates of any substantial size have been difficult to form in that fusing of the fibers in such faceplates into vacuum-tight relation has frequently resulted in the entrapment of air bubbles and the like between the fibers, such bubbles tending to extend into the centers of fibers for blocking light transmission therethrough.

The accuracy with which images may be transferred by a device of the above character is dependent upon the degree of similarity between the geometrical patterns of the ends of the fibers at the light-accepting and light-emitting faces of the device whereas the degree of resolution with which images are transferred is dependent upon the cross-sectional size of the fibers and the compactness with which they are grouped at said light-accepting and emitting faces. The smaller fibers and more compact groupings thereof produce the best resolution, within practical limits of fiber sizes. As for the intensity or amount of light which can be transferred through a device of the above character, the quality of the optical finish on the light-accepting and light-emitting faces of the device is of prime importance. High quality optical finishes on the end faces of such devices overcome the effects of diffusion which would exist at a poorly polished surface and thus allow more light to enter and pass through the fibers thereby improving the contrast and definition of the transferred images.

The present invention provides novel means for manufacturing superior fiber optical image transfer devices which are adapted to overcome the above-mentioned inefficiencies common to conventional devices of a similar nature and, accordingly, it is an object of the present invention to provide an improved fiber optical image transfer device having exceptionally high efficiency in image resolving power and accuracy of image reproduction and method and apparatus for making the same.

Another object is to provide an improved means and method for assembling an elongated array of relatively fine light-conducting fibers or filaments in fixed, accurate, side-by-side aligned relation with each other with the cross-sectional pattern of at least the opposite ends of said array of fibers being accurately identically geometrically patterned.

Another object is to provide an improved apparatus for manufacturing fiberscopes, more particularly of the flexible type wherein the light-conducting fibers thereof are intimately bundled and secured together only throughout a predetermined section at each of their opposite ends while being disconnected and free to flex individually between said opposite ends.

Another object is to provide novel means for forming the end sections of a flexible fiberscope of the above type wherein the light-conducting fibers thereof are compacted and simultaneously fused together at their opposite ends in such manner as to reduce the cross-sectional size of the end sections of the fiberscopes to a minimum without reducing the cross-sectional sizes of the individual fibers or, in any way, deterring the light-conducting capabilities of said fibers.

A further object is to provide a flexible fiberscope of the above character having the exposed opposite ends of the fibers thereof substantially identically geometrically patterned and so interfitted in fused relation with each other as to collectively form a substantially uninterrupted or continuous face portion at each end of the fiberscope.

Another object is to provide a flexible fiberscope device of the above character which is adapted to be subjected to elevated temperatures below the annealing point of the glass thereof when in use.

A further object is to provide an improved apparatus for manufacturing fiber optical faceplates having the exposed opposite ends of the faceplate fibers arranged in substantially identical geometrical patterns and having the fibers fused together in intimate, vacuum-tight relation throughout their length.

Another object of this invention is to provide such an apparatus for manufacturing fiber optical faceplates which are of substantial size including faceplates which may be relatively narrow for their length.

A still further object is to provide a simple, reliable, efficient and inexpensive apparatus for fabricating fiber optical devices of the above type which may be provided at the opposite ends thereof with highly finished optical surfaces, the device in general having high optical efficiencies and accuracy of image reproduction with exceptional image resolving powers.

Other objects and advantages of the invention will become apparent from the following description when taken in conjunction with the accompanying drawings in which:

FIG. 8 is an enlarged fragmentary side elevational view of an assembly of fiber hoops having a fused section which is illustrated diagrammatically as being transversely severed in accordance with a further step in the invention;

FIG. 9 is a fragmentary plan view of the assembly of fiber hoops following the operation illustrated by FIG. 8;

FIG. 10 is a partial cross-sectioned view of an optical instrument embodying a fiber optical fiberscope device of the character described above;

FIGS. 11 and 12 are enlarged views generally similar to FIGS. 6 and 7 each illustrating a different stage in an alternative method of forming a fused section in an assembly of fiber hoops;

FIG. 13 is an end view of a fiber optical device which was initially formed by the alternative method illustrated in FIGS. 11 and 12;

FIG. 14 is a perspective view of a mandrel such as is shown in FIG. 2 upon which has been wound a thread or filament of light-conducting material, the thread forming a helix to be used in preparing fiber optical faceplates;

FIG. 15 is a plan view of a fiber ribbon cut from the helix shown in FIG. 14;

FIG. 16 is a side cross-sectional view of a holder used for assembling the fiber ribbons of FIG. 15 to form a fiber optical faceplate;

FIG. 17 is a side cross-section view similar to FIG. 16 showing multifibers assembled in a holder to form a fiber optical faceplate;

FIG. 18 is a partial front cross-section view similar to FIG. 5 illustrating said holder and means used to fuse the fiber ribbons or multifibers into vacuum-tight relation;

FIG. 19 is a partial side cross-section view similar to FIG. 4 illustrating a subsequent step in the formation of such fiber optical faceplates;

FIG. 20 is a front elevation view of a fiber optical faceplate prepared by this invention; and FIG. 21 is an end elevation view of the faceplate illustrated in FIG. 20.

As mentioned hereinabove, the fiber optical device of the invention is composed of a considerable number of elongated relatively fine light-conducting filaments or fibers each of which must be capable of readily and efficiently transferring light from one of its ends to the other thereof. In a preferred form of this invention, the fibers embody a core part of a relatively high index glass such as, for example, an optical flint glass having an index of refraction of approximately 1.62 and a relatively thin outer coating or cladding of a low index glass having substantially the same coefficient of expansion and melting temperature as the high index core glass. An optical crown or soda-lime glass having an index of refraction of approximately 1.52, for example, might be used. It is to be understood, however, that the fibers may be formed of combinations of other types and indices of glasses or other suitable materials and also that uncoated fibers could be used to form the devices of the invention. In most instances, coated or clad fibers are preferred since the low index outer cladding will optically function in a well-known manner to insulate one fiber from an adjacent fiber in a bundle thereof by insuring total internal reflection of all light entering a fiber at one end and travelling therethrough to its opposite end.

Figure 1:
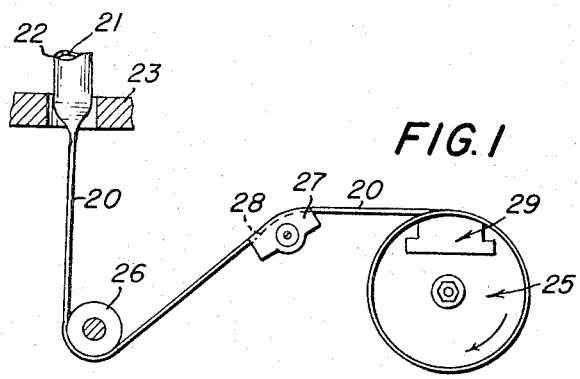
FIG. 1 is a diagrammatic illustration of a part of the apparatus used in forming certain of the fiber optical devices of this invention.

By referring more particularly to the drawings, it will be seen that in FIG. 1 there is shown diagrammatically means for forming a continuous light-conducting fiber 20 of the above-described clad type. The forming of the fiber 20 is accomplished by initially providing a rod 21 of high index core glass having a sleeve 22 or outer surrounding layer of low index cladding glass and placing one end of the rod and sleeve assembly within a ring-like heating element 23 (of known construction) to soften the glasses of the assembly sufficiently to permit a uniform endwise drawing of the fiber 20 from the rod and sleeve assembly. The size of the fiber 20 is controlled by the rate of uniform drawing when the rod 21 and sleeve 22 assembly is heated to a proper drawing temperature. It is pointed out that regardless of the fineness or size to which the fiber is drawn, the relative proportions of the cross-sectional sizes of the core and cladding parts of the fiber 20 will remain substantially the same as that of the rod 21 and sleeve 22 assembly. Thus, the relative cross-sectional sizes of the rod 21 and sleeve 22 are initially controlled in known manner in accordance with the relative proportions desired of the parts of the finally formed fibers 20.

Figure 3:
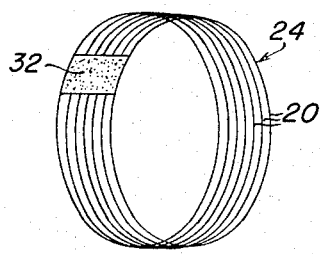
FIG. 3 is a perspective view of a helix or hoop formed of said filament which has been removed from the mandrel of FIGS. 1 and 2.

Having thus provided means for forming a continuous optically insulated fiber 20, accurately constructed helices or hoops 24 of the fiber 20, such as shown in FIG. 3, can be wound directly on a drum or mandrel 25 which, in the arrangement shown, functions to draw the fiber 20 to a desired size while simultaneously providing means to support the convolutes of the helices 24.

The fiber 20 is directed around an idling roller 26, over a guide member 27 and through a transverse U-shaped groove 28 in said guide member and the leading end of the fiber 20 is taped or otherwise anchored to the mandrel 25. The mandrel which is preferably carried on the spindle of a machine lathe or the like (not shown) is rotated at a precontrolled uniform rate to draw the fiber 20 and simultaneously produce successive convolutes or turns thereof about its outer peripheral surface. In order to accurately form or wind a substantially closed helix 24 on the mandrel 25, the guide member 27 is preferably suitably mounted on and carried by a conventional lathe carriage traversing mechanism or the like (not shown) so as to be driven in a direction parallel to the axis of rotation of the mandrel at a precontrolled rate in accordance with the rate of rotation of the mandrel.

The fiber helices 24 formed on the mandrel 25 can be used for forming fiber optical image transfer devices of the fiberscope or faceplate type. Where the helices are to be used in forming fiberscopes, the overall length of the fiber optical image transfer devices of the invention will be substantially equal to the circumference of the mandrel 25 as will become more readily apparent from the description to follow. Therefore, the size or diameter of the mandrel is chosen in accordance with the length desired of the device to be manufactured while at the same time, the thinness of the fiber 20 and diameter of the mandrel 25 are selected to be such as to avoid breakage of the fiber by too sharp a bend for the particular size fiber being wound.

Figure 2:
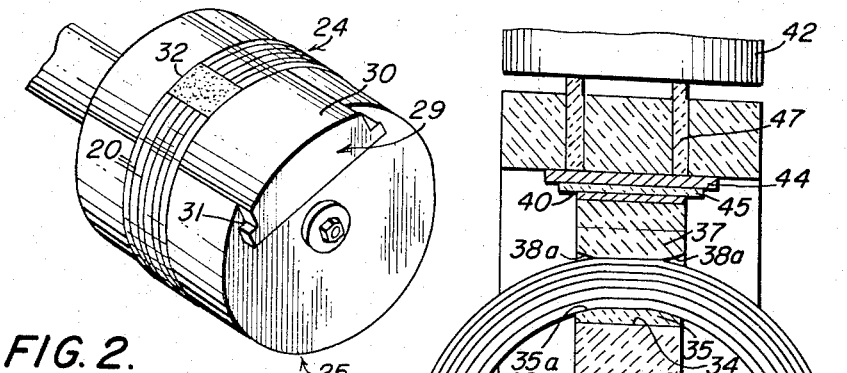
FIG. 2 is a perspective view of the mandrel or drum shown in FIG. 1 upon which has been wound a thread or filament of light-conducting material for use in forming said devices.

Due to the fact that use of the helix for forming a fiberscope requires that the helix or hoop 24 be removed from the mandrel 25 to provide independent structures such as shown in FIG. 3, the mandrel 25 is provided with a removable section 29 having an outer surface 30 shaped to the outer peripheral surface curvature of the mandrel to form a smooth continuous winding surface completely around the drum when the section 29 is in place as shown in FIGS. 1 and 2. The section 29 is removed by sliding the same endwise out of its receiving channel 31 in the mandrel and the section 29 and channel 31 are preferably tapered toward one end of the mandrel to interfit with each other and cause the section 29 to drop down or away from the helix 24 when slid endwise out of its receiving channel. With the helix 24 loosened on the drum by removal of the section 29, it can be easily and simply slipped endwise off the mandrel.

It should be understood that other types of winding drums or mandrels which may be collapsed in a well-known manner might also be used to form helices 24 to be used in forming fiberscopes. It is only of importance to this embodiment of the invention that means is provided for permitting the helices 24 to be easily removed from the winding drum or mandrel 25 without disrupting the above-mentioned closely wound relationship of the convolutes of the helices.

Prior to the removal of the helices 24 from the mandrel 25, however, means must be provided to keep the convolutes of the helices 24 in fixed relation to each other and to render the helices 24 self-supporting when removed from the mandrel. This is accomplished by cementing the convolutes of the helices 24 together along a transverse section or strip 32, such as shown in FIG. 2. It has been found that a cement formed of cellulose nitrate in a solvent of nitromethane will provide a very satisfactory bond and that the cellulose nitrate will burn off very readily leaving substantially no residue when the fibers 20 of the helices 24 are heated to fusing temperatures in the steps of the process to follow. Such a cement or others having similar characteristics will permit a clean and secure fusion between the adjoining parts of the fibers.

Previous to the winding of a helix 24 on the mandrel 25, the winding surface of the mandrel may be covered with a plastic sheet material to prevent the cement from sticking to the mandrel and hindering the removal of the helix.

In assembling the fiberscope device of the invention, a plurality of helices or hoops 24 each of a width substantially equal to that desired of the device are first stacked in progressive surrounding relation with each other to form a bundle of a thickness slightly greater than that desired of the finished device.

It is pointed out at this time that the helices or hoops 24 may be formed individually or one at a time on the mandrel 25 to substantially the width desired of the finished device or a wide helix may be formed across the entire width of the mandrel, provided with a cemented strip 32 and thereafter cut up into a plurality of more narrow helices or hoops by severing the strip 32 in the direction of the convolutes.

During the stacking of the hoops 24, it is important that all the layers of the resultant bundle thereof have the same helix direction. That is, each hoop 24 must be progressively placed in surrounding relation with the previous hoop and the direction of wind or helix of each hoop should match that of its predecessor.

While only single layer helices or hoops 24 have been described above, it should be understood that multi-layer hoops may be formed on the mandrel 25 particularly in instances where very small diameter fibers are used. In such instances, each successive layer would preferably be wound separately over its preceding layer in the same helix direction and the successive layers would be joined together with a strip of cement such as described above.

Since, in the present invention, a predetermined section of the stacked or bundled hoops 24 is to be fused together with heat and pressure to form the opposite ends of the final fiber optical device as will be described in detail hereinafter, the assembly of hoops 24 is made directly in a support 33 constructed of a refractory material preferably of the type disclosed in patents No. 2,440,187 and No. 2,764,491. The refractory material disclosed in said patents is exceptionally geometrically stable and distortionless when subjected to glass-fusing temperatures and molten glass will not adhere to its surfaces by fusion. However, to facilitate removal of the fused assembly of hoops, a parting agent or gold foil or the like (not shown) may be used between the fiber bundle and refractory material to avoid possible difficulty in removing the glass of the fibers from the support 33 which difficulty might result from glass flowing into scratches or other imperfections in the support 33. The support 33 (see FIGS. 4 and 5) is provided with a rectangular U-shaped channel 34 extending from front to back and opening outwardly at the top thereof. Where gold foil or the like is not used to facilitate ultimate removal of the fiber hoop section from the support, the bottom and side walls of the channel 34 can be lined with removable rectangular fillers or blocks 35 and 36 respectively, also of said refractory material, between which, as shown, there is provided a space of a width substantially equal to the width desired of the fiber optical device to be formed.

Figure 4:
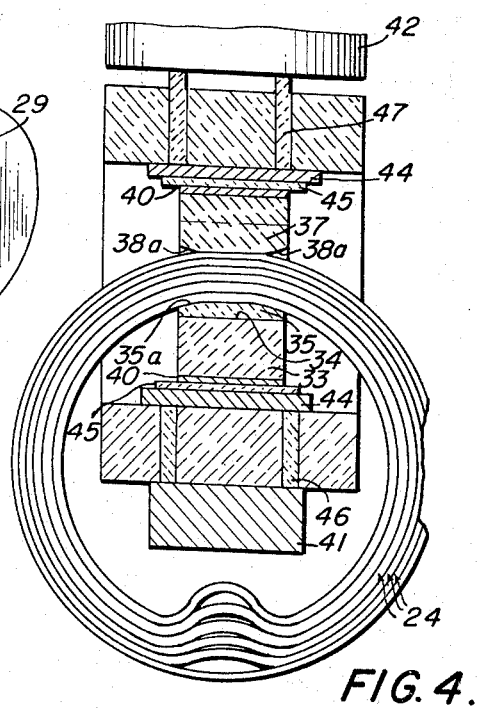
FIG. 4 is a side cross-sectional view of a combined holder and forming member in which an assembly of fibers such as the plurality of hoops illustrated by FIG. 3 have been placed for subsequent processing.
Figure 5:
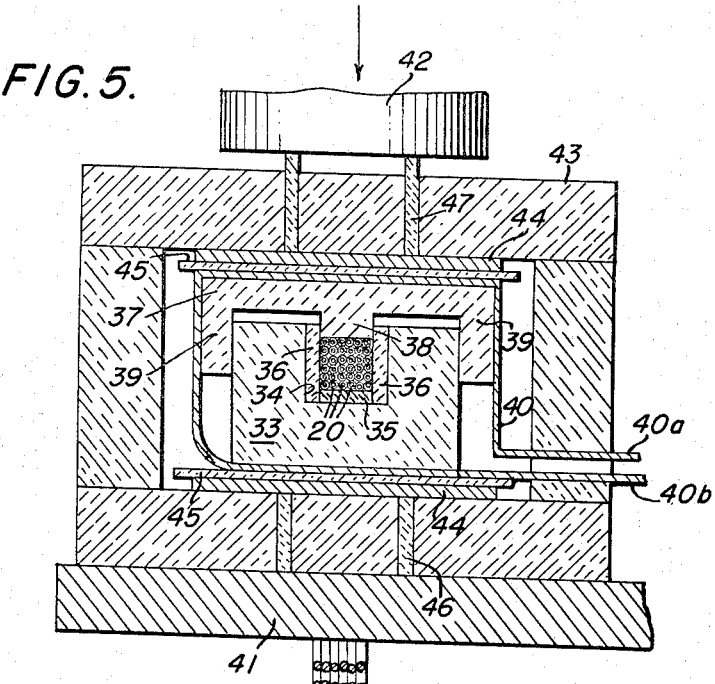
FIG. 5 is a front cross-sectional view of said forming member and means used to fuse the fibers or filaments of a section of the assembly of hoops as shown in FIG. 4.
Figure 6:
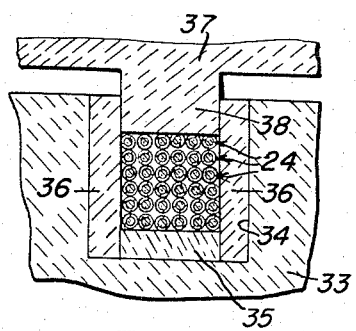
FIG. 6 is an enlarged fragmentary cross-sectional view of the forming means and fibers illustrating a first stage in the forming of the fused end sections of a fiberscope.

The hoops 24 being of a width substantially equal to that of the space between blocks 36 automatically become superimposed with each other when stacked in the support 33. That is, as shown in FIGS. 4, 5 and 6, the fibers in the hoops stack in regular aligned rows without tending to nest between fibers of adjacent hoops. It will be noted, however, that due to the cross-sectional shape of the fibers 20, which are circular as is most generally the case, there are a great many voids or spaces between the adjacent fibers even though the fibers are relatively tightly packed or in adjoining side-by-side relation with each other as shown in FIG. 6.

While the fibers 20 may be cemented or otherwise secured together in this condition to form a flexible fiberscope as has been done heretofore, it can be seen that the cross-sectional area of the bundle which includes the voids or spaces between the fibers would not provide a light-receiving or emitting face capable of producing the best image resolution.

The present invention provides for the compacting of the fibers throughout the section of the bundle in support 33 while simultaneously fusing the same together thereby reducing the overall cross-sectional size of the bundle and eliminating the voids or spaces between the fibers while preventing the entrapment of air bubbles and the like between the fibers.

To this end, a cover member 37 is provided to fit over the support 33 and embodies a rectangular depending section 38 which fits intimately into the space between the blocks 36 and engages the top layer of fibers of the stacked bundle thereof. The cover member is preferably formed of the same refractory material as that of the support 33 and is provided with side parts 39 adapted to fit against the outer sides of the support 33 and accurately guide the cover member 37 downwardly during the compacting and fusing of the fibers 20.

In performing the fusing operation, at which time the fibers 20 are compacted, the support 33 and cover 37 with the stacked hoops 24 therein are surrounded with a heating element 40, such as shown in FIG. 5, and the assembly is placed between the base 41 and plunger 42 of a suitable press. The heating element 40 may consist of conventional resistance heating coils or a strip or band of durable high resistance metal such as Nichrome which when having its ends 40a and 40b connected across a suitable supply of electrical current will heat the glass of the fibers in the support 33 to a fusing temperature. However, the heating element 40 is disposed around the refractory members 33 and 37 in contact therewith to provide for heating of the entire periphery of the section of the hoops 24 to be fused, the heating element being adapted to remain in contact with the refractory members during relative movement of the members. Thermocouples (not shown) may be placed near the section of the fibers to be fused and electrically connected in circuit with the element 40 for use in controlling the heat produced thereby in a conventional manner.

As will be readily understood, the support 33 and the cover 37 are arranged between a base 41 and a plunger 42 by means of which the cover and support can be forced together for compacting the hoop sections within the support 33 to remove voids and spaces from between the hoop fibers. Since it is desirable to contain a large part of the heat developed by the element 40 within the area of the fibers to be fused, a heat-insulating layer of conventional insulating brick or millboard 43 or the like is provided around the assembly of the heater 40, support 33 and cover 37, see FIG. 5, for insulating the heating element 40 from the base 41 and from the plunger 42. However, the sides of the refractory members 33 and 37 which are not contacted by the heating element 40 are permitted to remain uninsulated for a purpose which will be explained below. In order to further insulate the base 41 and plunger 42 from the heat of the element 40, while still permitting the same to make a solid engagement with the respective support 33 and cover part 37, stainless steel plates 44, electrically insulated from the heating element 40 by sheets of mica or the like 45, are placed against the respective support and cover parts 33 and 37 and tubular extensions 46 and 47 of rigid heat-resistive refractory material extend through the insulating brick to span the space between the steel plates and the respective base and plunger parts of the press. The plates 44 distribute the load on support 33 and cover 37 uniformly to avoid cracking thereof. The force of the plunger 42 is exerted through the tubular extensions 46 and 47 which act to support the weight of the fusing apparatus and the pressure applied thereto without compressing the insulation 43.

In performing the fusing and compacting of the fibers 20 throughout the major portion of the section of the bundle of fibers which is within the support 33, a controlled squeezing pressure is applied to the fiber bundle by forcing the cover member 37 downwardly with the plunger 42 while heating the fibers 20 to a temperature which is sufficient to fuse the claddings thereof together. This causes the fibers to be compressed and simultaneously deformed only an amount sufficient to close off or fill in substantially all voids between the fibers without causing a material reduction in the cross-sectional area of the fibers. That is, for example, fibers 20 which are round in cross-section will be deformed into rectangular cross-sectional shape without substantially altering the cross-sectional area of the fiber. For example, with fibers having a core part of 1.62 index flint glass and claddings of 1.52 index soda-lime or crown glass, compacting of the fibers at fusing temperatures of from 1140° F. to 1150° F. maximum for a period of time of approximately ten minutes at a pressure of approximately 200 lbs./sq. inch maximum will produce good results, it being understood that the pressures, temperatures and time cycles will vary in accordance with the type of glasses or materials used to form the fibers 20.

In referring more particularly to FIG. 4, it will be seen that the filler or block 35 and the depending part 38 of the cover 37 can be bevelled at 35a and 38a respectively so as to gradually slope away from each other adjacent opposite ends of the opening in which the fiber hoops 24 are supported. The bevels 35a and 38a function to provide a pressure gradient on the fibers 20 of the hoops 24 wherein, during the above-mentioned fusing operation, the compressing or compacting force on the bundle of hoops 24 is at a maximum along a plane extending transversely through the center of the hoop section to be fused and is of a gradually lessening degree extending in an outward direction along the length of said fibers toward respective opposite bevels 35a and 38a.

Alternatively or in addition to the described pressure gradient, a temperature gradient can be provided in the hoop section to be fused wherein the temperature during a fusing operation is greatest in a plane extending through the centermost part of the section of fibers being fused. This temperature gradient in the illustrated embodiment of the invention results from positioning of the heating element 40 in a ring around the hoop section to be fused and from positioning of the insulation 43 in a ring around the heating element while leaving the sides of the refractory members 33 and 37 uninsulated as described above. As will be readily understood, the thickness of the insulation 43 and the overhang of the insulation 43 at the side of the heating element 40 can be proportioned relative to the heat developed by the heater element and to the areas of the refractory members which are free to radiate heat without obstruction to achieve the desired temperature gradient wherein the center portions of each fiber can be heated to a relatively high fusing temperature and portions of the fibers extending progressively outward from said center portions can be heated to relatively lower fusing temperatures. Although a ring-shaped, resistance type of heater element is herein described for purpose of establishing a temperature gradient in the section to be fused, other similar heating element arrangements utilizing dielectric heating devices for example for achieving said temperature gradient are within the scope of this invention. The combination of the described pressure and temperature gradients causes the centermost area of the section of fibers 20 within the support 33 to soften and fuse before the outer areas thereof which for example, are adjacent the bevels 35a and 38a. In cases where complete fusion is desired, this effect gradually forces air or gases outwardly from between the fibers being fused and produces a substantially perfect air-tight fusion between the fibers without entrapment of air or gas bubbles or the like in the fused areas.

It will be noted that although the described temperature gradient is to be desired, close control of the temperature in the fiber section to be fused is required and it is desirable to prevent the development of hot spots within the section to be fused. This prevents the development of harmful flow patterns within the fibers to be fused and assures retention of the identity of individual fibers and fiber coatings by preventing excessive melting of the fiber materials. For this purpose, the heater element 40 is disposed in contact with the refractory members 33 and 37, the heater element being adapted to move with the refractory members during compression of the fiber section to be fused. This construction assures rapid response of the heater element controls to change of temperature within the fiber section being fused and assures constant heating effect in response to a constant current supply to the heater element. For further control of the heating process to prevent the development of hot spots in the fiber section, the insulation 43 can be shielded with aluminum foil or can be adapted by other suitable radiation-shielding means for decreasing heat-dissipating radiation at localized areas of the insulation, thereby to assure that the fiber section will be properly heated without random temperature gradients therein other than the desired temperature gradient above described.

Figure 7:
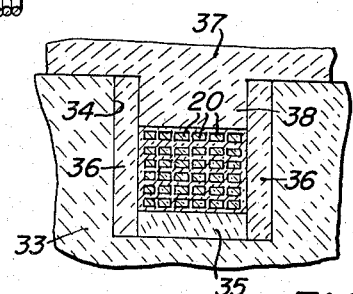
FIG. 7 is an enlarged view generally similar to FIG. 6 illustrating a later stage in the forming of said fused fiber section.

In FIG. 7, which illustates a cross-section of the fiber bundle after being fused and compressed, it can be seen that the fibers 20 are retained in precisely the same geometrical or accurately superimposed relation with each other as they were before fusion (see FIG. 6). The fibers 20, however, have been reformed to a substantially rectangular cross-sectional shape by being forced downwardly against the block 35.

After fusing and cooling of the section of the fiber hoops 24 which are stacked in the support 33, the cover 37 is removed and the fused fiber bundle is lifted out of the support 33, preferably by sliding the blocks 35 and 36 along with the fiber bundle out of the channel 34. Upon removal from the channel 34, the blocks 35 and 36 may be easily lifted from the fiber bundle.

While, as stated above, glass will not stick to the refractory material disclosed by Patents No. 2,440,187 and No. 2,764,491, it is preferable to use at least the filler blocks 35 in the construction of the support 33 since slight scratches or other imperfections on the interface between the refractory material and the glass of the fibers resulting from continued use of the support 33 might permit some glass to flow thereinto during the fusing operation. The filler block 36 can also be used if desired but is not entirely necessary. If such blocks are not used and if glass should fill scratches and the like in the support 33, difficulty might be experienced in removing the finally fused fiber bundle from the support if it were constructed as a one-piece unit. With the construction shown and described above, the adjoining surfaces of the blocks 35, 36 and the channel 34 will always be free to slide relative to each other and permit quick and easy removal of the fiber bundle.

After removal from the support 33, the fused section of the fiber bundle is placed substantially centrally over a support 48 having a groove 49 therein. FIG. 8, with the helix direction of the fibers 20 in the bundle aligned substantially at right angles to the groove 49. The fused section is then severed in a direction along the axis of the groove 49 as illustrated in FIG. 8. A suitable diamond impregnated saw 50 or other thin cutting tool of known construction is used to sever the fiber bundle.

When opened up, as shown in FIG. 9, the once continuous fiber bundle of stacked fiber hoops 24 become an elongated fiberscope with substantially identical opposite end faces 51 and 52. Due to the fact that the ends 51 and 52 were once integral and the amount of stock removed from between the same is only equal to the thickness of a saw cut, the geometrical patterns of the fibers at the faces 51 and 52 are substantially identical. Furthermore, since the individual helices or hoops were each initially formed to have substantially equal outside diameters and were stacked in progressive surrounding relation with each other (see FIG. 4), the saw cut illustrated in FIG. 8 will sever each of the fibers 20 in a plane substantially normal to their longitudinal axes and thereby cause all of the fibers 20 of the severed assembly to be of substantially the same length.

The end faces 51 and 52 of the device shown in FIG. 9 are optically ground and polished, with the use of conventional equipment commonly used for forming optical flats thereby rendering the device ready for use as a fiberscope. In FIG. 10, there is diagrammatically illustrated a typical fiber optical instrument wherein an eye lens 53 is supported adjacent one end face 52 of the fiber optical device and an objective lens or the like 54 is supported adjacent the opposite end face 51 thereof. The fiber optical device of FIG. 9, however, has many other known uses and may be placed in a catheter, for example, and used as an optical probe for examining body fluids or it may be used as an endoscope, gastroscope or as a vital part of a wide variety of sighting devices.

It is pointed out that by compacting the fibers 20 during the fusing operation discussed above so as to ultimately provide end faces 51 and 52 which are continuous, that is, without spaces therebetween, it is possible to produce an exceptionally high quality of optical finish on said faces. Porous surfaces or surfaces having interstices generally cannot be provided with the best optical polishes.

Heretofore, fiberscopes of the above general type have been subject to a great deal of breakage of the fibers adjacent each of the joined end sections when the fiberscopes are flexed. This is believed to be due to an abrupt transition between the rigid end sections of the fibers and the flexible mid-sections.

In the devices formed in accordance with the invention, a gradual transition between the rigid end portions and the flexible mid-section is provided to prevent undue breakage of fibers. This gradual transition is believed to result in part from the use of the bevels 35a and 38a on the respective support and cover parts 33 and 37 and from use of the described temperature gradients in fusing of the fibers.

While, in the devices of the invention, breakage of the fibers adjacent the rigid end sections is greatly reduced, it has been found that a more durable final product can be had by impregnating a relatively short section of the disconnected portions of the fibers near the solidly fused ends of the devices with a filler such as polyvinyl alcohol, cellulose nitrate or a suitable resin or the like. The filler while lending support to the fibers should be resilient enough to permit some relative movement between the fibers.

A completely surrounding outer sheath or covering 52a (see FIG. 10) is usually applied to the device to further protect the unfused section of the fibers and to provide additional support at the junction of the fused and unfused section thereof.

In FIGS. 11, 12 and 13, there is shown a modification of the invention wherein compressing forces on a stack of fiber hoops such as discussed hereinabove are applied substantially equally in both the vertical and horizontal meridians thereof during a fusing operation to provide the fibers with a substantially square cross-section such as shown in FIGS. 12 and 13 while simultaneously providing the said end sections with surrounding integrally fused collars or adaptors to which auxiliary lens systems such as shown in FIG. 10 or the like may be attached.

In forming the fused section of a stacked bundle of fiber hoops in accordance with the modification shown in FIGS. 11–13, there is provided a support 33' and cover member 37' similar to the above-described support 33 and cover 37 arrangement. The process described hereinabove with relation to FIGS. 1–9 is followed with the exception that block-like pieces 55 preferably formed of a material similar to that of the core of the fibers 20' are placed at the inner sides of the refractory blocks 36' which are similar to blocks 36. Pieces 56 are positioned above and below the bundle of fibers 20' to be fused (see FIG. 11) and the depending section 38' of the cover 37' is constructed to be of a width substantially equal to the spacing between the refractory blocks 36' so as to engage the uppermost ends of the pieces 55.

The pieces 55 and 56 are preferably formed of a material which is characterized in that it has substantially the same coefficient of expansion and a slightly lower melting temperature than the core of the fibers 20' and will fuse to the fibers 20' at substantially the same temperature as is required to fuse the claddings of the fibers. For example, if the fibers 20' have a core of flint glass of a particular index of refraction, the pieces 55 and 56 would be constructed of the same or similar type of flint glass so as to be free to deform at temperatures approximately equal to or slightly below that the of the fiber.

Since the pieces 55 extend from the block 35' to the section 38' of the cover 37' (see FIG. 11) it can be seen that as the section 38' is lowered into the channel 34', under pressure, with the glass pieces 55 and 56 and fibers 20' heat-softened, the endwise compressing force on the heat-softened pieces 55 will cause them to displace laterally against the bundle of fibers to compress the fibers in the horizontal direction while at the same time, the uppermost piece 56 forces the fibers 20' downwardly to compress them in the vertical direction with the result that by proper control of the sizes of the pieces 55 and 56, a square or other desired cross-sectional shape can be provided on the fibers 20' as shown in FIG. 12.

It is pointed out that the forming of the fused section of a fiber assembly as described with relation to FIGS. 11 and 12 assures that all of the fibers 20' of the assembly thereof are formed to substantially the same cross-sectional shape and size. That is, the fibers adjacent the peripheral edges of the assembly are not subjected to any shearing action or otherwise caused to become weakened in cross-section by the downward movement of the depending part 38' of the cover member 37'. Since the outermost fibers 20' of the assembly thereof do not engage the sides of the refractory material of the support 33' but are completely surrounded by the glass pieces 55 and 56, there is no possibility of the fibers 20' becoming mis-shapen due to sticking or resistance to downward movement along the sides of the refractory blocks 36' during the compacting and fusing operation.

After fusion, the fiber bundle along with the fused pieces 55 and 56, which now form a continuous outer collar 57 (see FIGS. 12 and 13) around the fiber bundle, is lifted from the support 33', cut to form the end faces of a fiberscope and said end faces are optically ground and polished. The cutting, grinding and polishing operations are identical to those described above with reference to FIGS. 1–9.

With a fiber optical device formed as described with relation to FIGS. 11, 12 and 13, the collar 57 may be ground or otherwise provided with any desired outer contour shape, such as shown in FIG. 13, so as to provide means for receiving auxiliary lens elements or the like such as shown, for example, by 53 and 54 of FIG. 10.

In FIGS. 14–21, the method and apparatus provided by this invention is illustrated with reference to the formation of fiber optical faceplates. According to the invention, there is preferably provided a plurality of members each embodying a number of light-conducting fibers in side-by-side relation, the members being adapted to be stacked in further side-by-side relation for forming a faceplate. For example, as shown in FIG. 14, a mandrel 58 which need not be of the collapsible type but which is otherwise similar to the mandrel 25 can be mounted upon a conventional lathe carriage traversing mechanism or the like (not shown), and a light-conducting fiber 20 can be wound upon the mandrel to form a closely-wound helix 59, the convolutions of the helix being secured together throughout their length so that strips of the helix can be cut therefrom to form flat fiber ribbons 60 as shown in FIG. 15. For example, the mandrel 58 can be covered with a thin plastic sheet (not shown) which is then coated with one or more layers of cement such as cellulose nitrate in a solvent of nitromethane. The fiber 20 can then be wound upon the mandrel to form the helix 59 and the helix can be coated with said cement. The helix can then be taped or otherwise secured to the mandrel as at 61 and 62 and can be cut along lines 63 and 64 by any conventional means, each cut being normal to the axes of the fibers and parallel to the mandrel axis. In this arrangement, a fiber ribbon 60 can be stripped from the mandrel 58 between the helix cuts 63 and 64, the plastic fiber on the mandrel permitting easy removal of the ribbon from the mandrel. Alternatively, the helix can be scribed along lines 63 and 64 and other lines similar thereto around the helix periphery. The helix can then be removed and broken into ribbons 60 along said scribed lines, this latter technique not requiring taping or other securing of the helix to the mandrel since the undercoat of cement on the fibers will assure retention of the helix configuration until the helix is removed from the mandrel. Since the fiber ribbon 60 will be coated on each side with the cellulose nitrate cement, the fiber ribbon or ribbons will lie flat and will not tend to curl up, and, since the ribbon has been cut from the helix normal to the fiber axes and parallel to the mandrel axis, the edges 60.1 and 60.2 of the ribbon will be square-cut. As will be readily understood, the axial length of the helix determines the maximum length of the ribbon 60 transversely of the ribbon fibers, and the diameter of the helix determines the number of such ribbons which can be cut therefrom. Of course, the ribbons can be cut to shorter lengths if desired. It should also be understood that the ribbons 60 can be formed in any comparable manner within the scope of this invention.

In forming the ribbons 60 into a fused fiber optical faceplate, the ribbons are stacked within a channel 34" of a refractory support 33", the support channel preferably being lined with refractory filler blocks 35" and 36" as shown in FIGS. 16 and 18 in a manner corresponding to that described with reference to FIGS. 4 and 5. For facilitating positioning of the ribbons in the support, the support can be disposed in tilted position upon a wedge 65, and a plate 66 can be temporarily cemented or otherwise attached to the support member edge for defining the end of the channel 34". The ribbons 60 can then be placed within the channel and can be taped into abutting relation to the plate 66. Where the fiber ribbons are of the proper length transversely of the ribbon fibers, so that the ribbons fit closely between the filler blocks 36", the ribbons will stack in accurately superimposed relation with each other as described above with reference to FIGS. 4 and 5. If desired, the ribbons 60 can be stacked in said accurately superimposed relation between these glass plates 67, as shown in FIGS. 16 and 18 and can be placed in the support member 33" and further aligned if necessary.

A cover 37" having a depending section 38" similar to the cover 37 previously described can then be fitted over the support member 33" so that the depending section of the cover is adapted to engage the fibers within the support member channel 34". The cover 37" and the support 33" are then enclosed with a ring-shaped heating element 40" similar to the heating element 40 previously described, and are disposed within a press arrangement as described above with reference to FIGS. 4 and 5. As indicated particularly in FIG. 19, the press arrangement can again provide for heating and insulating a peripheral strip around the refractory members 33" and 37" so that the ratio of insulated surfaces of the refractory members relative to the uninsulated surfaces of the members and to the uninsulated ends of the fiber ribbons 60 can be again adapted to establish a temperature gradient in the fibers held within the support, the temperature gradient being such that the fibers are brought to fusing temperature throughout their length but are heated to the highest temperature in a plane extending transversely of the fibers through the center of said support channel 34". As shown in FIG. 19, the depending cover section 38" is preferably bevelled or otherwise flared as at 38a" so that the cover can be pressed against the fiber ribbons within the support to establish a pressure gradient therein, whereby the fibers are first forced into fused relation with each other in a plane extending through the center of the section and are then forced into fused relation progressively outward from said plane, thereby to sweep air and other gases from between the fiber lengths embodied in the ribbons 60. To achieve this result with fibers of relatively small diameter, the flare at the end of the cover section away from the fibers to be engaged need be only about 0.010 inch, the extent of this flare being exaggerated in FIG. 19 for clarity of illustration. If desired, the filler block 35" can also be provided with similar bevels 35a", as shown, for aiding in the establishment of said pressure gradient.

Alternatively, the support 33" can be filled with multi-fiber units 68 each embodying a plurality of light-conducting fibers similar to the fiber 20 which have been preliminarily fused together in well-known manner. As will be understood, the multifiber units can be stacked within the support member channel 34" in side-by-side relation and can be compacted and fused in the same manner as described immediately above.

In either of these arrangements, there is formed a fiber optical faceplate 69 as shown in FIGS. 20 and 21 wherein the fibers embodied therein are compacted into intimately fused vacuum-tight relation without entrapment of bubbles and the like between the fibers. Further, the ends of the fibers are compacted into identical geometrical patterns wherein the fibers may be altered in cross-sectional shape for eliminating interstices therebetween but retain substantially their original cross-sectional area, the fibers having their minimum cross-sectional area in a plane extending transversely through the center of the fibers. As will be understood, the end faces 69.1 and 69.2 of the faceplate can be optically finished in conventional manner for rendering the fibers embodied therein readily receptive to light.

From the foregoing, it can be seen that simple, efficient and economical means and method have been provided for accomplishing all of the objects and advantages of the invention. Nevertheless, it should be apparent that many changes in the details of construction, arrangement of parts or steps in the process may be made without departing from the spirit of the invention as expressed in the accompanying claims and the invention is not to be limited to the exact matters shown and described as only the preferred matters have been given by way of illustration.

Having described my invention, I claim:

1. Apparatus for pressing and fusing together a number of glass clad light-conducting fibers in a bundle thereof throughout a given length of the bundle comprising:
    supporting means of refractory material having bottom 35 and cover 38 members, side walls 36 and opposite open ends forming an elongated channel through the supporting means, at least one of said members being slidable in said channel in directions toward and away from the other member, said members having facing surfaces each of a length equal to that of said channel and between which said bundle is extended for fusion with the application of heat and a compressing force tending to move said members one toward the other;
    said facing surfaces of said bottom and cover members having oppositely disposed end portions of their respective lengths sloped gradually away from each other in directions from points internally of the supporting means toward each of said open ends thereof so that a transverse dimension of said channel is greater at the ends of said channel than at intermediate points thereof whereby fibers in said length of said bundle will become compacted to a greatest amount intermediately of their extension in said channel and in progressively lesser amounts away therefrom upon application of said heat and compressive force.

2. The apparatus according to claim 1 further comprising heating means encircling said supporting means intermediately of said channel therein, said heating means encompassing a relatively short portion of said length of said channel whereby said heat is applied to said bundle of fibers with greatest intensity in an intermediate section of the extension thereof in said channel and in progressively lesser intensities away from said intermediate section.

3. The apparatus according to claim 1 further comprising channel liner pieces of glass disposed along said sides and facing surfaces of said bottom and cover members, said pieces being preselected to have a fusing temperature so related to the fusing temperature of the cladding glass of said fibers in said bundle that, with said application of heat and compressing force, plastic flow of said pieces will effect compaction of said bundle in both vertical and horizontal directions transaxially thereof.

References Cited

UNITED STATES PATENTS

| | | | |
|---|---|---|---|
| 2,151,874 | 3/1939 | Simons | 65 |
| 2,215,214 | 9/1940 | Galey | 65—18 X |
| 2,354,931 | 8/1944 | Tolman. | |
| 2,440,187 | 4/1948 | Silverberg. | |
| 2,992,516 | 7/1961 | Norton. | |
| 2,302,664 | 12/1942 | Smith | 65—319 XR |
| 1,857,540 | 5/1932 | Hardenberg | 65—319 XR |
| 2,410,616 | 11/1946 | Webb | 65 |
| 3,196,738 | 7/1965 | Hicks | 65—4 |

S. LEON BASHORE, *Primary Examiner.*

FRANK W. MIGA, *Examiner.*